United States Patent [19]
Suzuki et al.

[11] Patent Number: 5,153,655
[45] Date of Patent: Oct. 6, 1992

[54] LATERAL SHIFT CONTROL FOR ENDLESS BELT AND FIXING APPARATUS USING SAME

[75] Inventors: Yoshihiko Suzuki, Tokyo; Shokyo Koh; Satoshi Mori, both of Yokohama; Koki Kuroda, Tokyo, all of Japan

[73] Assignee: Canon Kabushiki Kaisha, Tokyo, Japan

[21] Appl. No.: 637,209

[22] Filed: Jan. 3, 1991

[30] Foreign Application Priority Data

Jan. 11, 1990 [JP] Japan .................................. 2-4082
Jan. 12, 1990 [JP] Japan .................................. 2-5067

[51] Int. Cl.[5] ............................................ G03G 15/20
[52] U.S. Cl. .................................... 355/285; 198/807; 219/388; 226/171
[58] Field of Search ............ 355/282, 285, 286, 289, 355/290, 212; 198/807; 226/171, 172; 219/216, 388

[56] References Cited

U.S. PATENT DOCUMENTS

| | | | |
|---|---|---|---|
| 4,429,985 | 2/1984 | Yokota | 250/548 X |
| 4,462,676 | 7/1984 | Shimura et al. | 198/806 X |
| 4,557,372 | 12/1985 | Rajagopal | 198/807 |
| 4,565,439 | 1/1986 | Reynolds | 219/216 X |
| 4,750,608 | 6/1988 | Harpold | 198/807 |
| 4,959,040 | 9/1990 | Gardner et al. | 474/103 |
| 4,998,121 | 3/1991 | Koh et al. | 346/160 |
| 5,026,276 | 6/1991 | Hirabayashi et al. | 432/59 |
| 5,027,160 | 6/1991 | Okada et al. | 355/282 |
| 5,043,763 | 8/1991 | Koh et al. | 355/206 |
| 5,083,168 | 1/1992 | Kusaka et al. | 355/285 |

*Primary Examiner*—A. T. Grimley
*Assistant Examiner*—Christopher Horgan
*Attorney, Agent, or Firm*—Fitzpatrick, Cella, Harper & Scinto

[57] ABSTRACT

A lateral shift control apparatus for an endless belt includes a driver for applying to the endless belt a lateral shifting force in both lateral directons; a switching device for switching the direction of the lateral shifting force by the lateral shifting driver; and memory for storing the immediately previous lateral shifting direction by the driver.

24 Claims, 13 Drawing Sheets

LATERAL SHIFT CONTROL FOR ENDLESS BELT AND FIXING APPARATUS USING SAME

FIELD OF THE INVENTION AND RELATED ART

The present invention relates to an apparatus for controlling a lateral shift of an endless belt stretched and rotated around rollers, more particularly to an image fixing apparatus using an endless belt.

The machines using an endless belt include an image fixing apparatus and a photosensitive belt, but an image fixing apparatus will be taken in this specification as a typical example. As for the image fixing apparatus, various structures have been proposed such as heat roller fixing system.

Recently, U.S. Ser. Nos. 668,333, 409,341 (now U.S. Pat. No. 5,043,763), Ser. No. 416,539 (now U.S. Pat. No. 4,998,121), Ser. No. 426,082 (now U.S. Pat. No. 5,026,276), Ser. Nos., 735,709 430,437, 751,571, 440,678, 444,802, 446,449 (U.S. Pat. No. 5,027,160) have proposed an image fixing apparatus using a thin film endless belt, wherein the waiting period is reduced.

When an endless belt is used, the belt might shift during its rotation along an axis of the rotation (lateral shift). The lateral shift is caused by the mechanical inaccuracy in the parallelism or twisting between two or more endless belt stretching members such as rollers. However, the improvement of the mechanical accuracy is limited, and therefore, it is difficult to eliminate the lateral shift of the endless belt by increasing the mechanical accuracy.

It has been considered to forcedly confine the lateral shift using ribs or the like. However, if the endless belt film has a very small thickness in order to reduce the thermal capacity thereof, the mechanical lateral shift confinement would result in creasing of the film.

Therefore, as proposed in U.S. Ser. No. 446,449 (U.S. Pat. No. 5,027,160), it is preferable to detect the lateral shift by a sensor, and the lateral shifting direction is deliberately changed on the basis of the output of the sensor, by, for example displacing an axis of a tension roller, thus laterally reciprocating the endless belt within a predetermined range.

However, upon resumption of the lateral shift control as in after deactuation of the main switch, it would be possible that the lateral shift is rather increased if the initial setting is set to a fixed position, with the possible result of damage of the film.

SUMMARY OF THE INVENTION

Accordingly, it is a principal object of the present invention to provide a lateral shift control apparatus wherein the lateral shift of the endless belt is prevented.

It is another object of the present invention to provide a lateral shift control apparatus for an endless belt wherein the direction of deliberate lateral shifting upon the main switch actuation is made equal to the direction of the deliberate lateral shifting direction immediately before the main switch is deactuated.

It is a further object of the present invention to provide a lateral shift control apparatus for an endless belt having storing means for storing lateral shift direction of the endless belt.

It is a further object of the present invention to provide an image fixing apparatus wherein the endless film belt is effectively prevented from being damaged.

These and other objects, features and advantages of the present invention will become more apparent upon a consideration of the following description of the preferred embodiments of the present invention when taken in conjunction with the accompanying drawings.

DESCRIPTION OF THE PREFERRED EMBODIMENTS

Embodiments of the present invention will be described in conjunction with the accompanying drawings.

Figure 1:
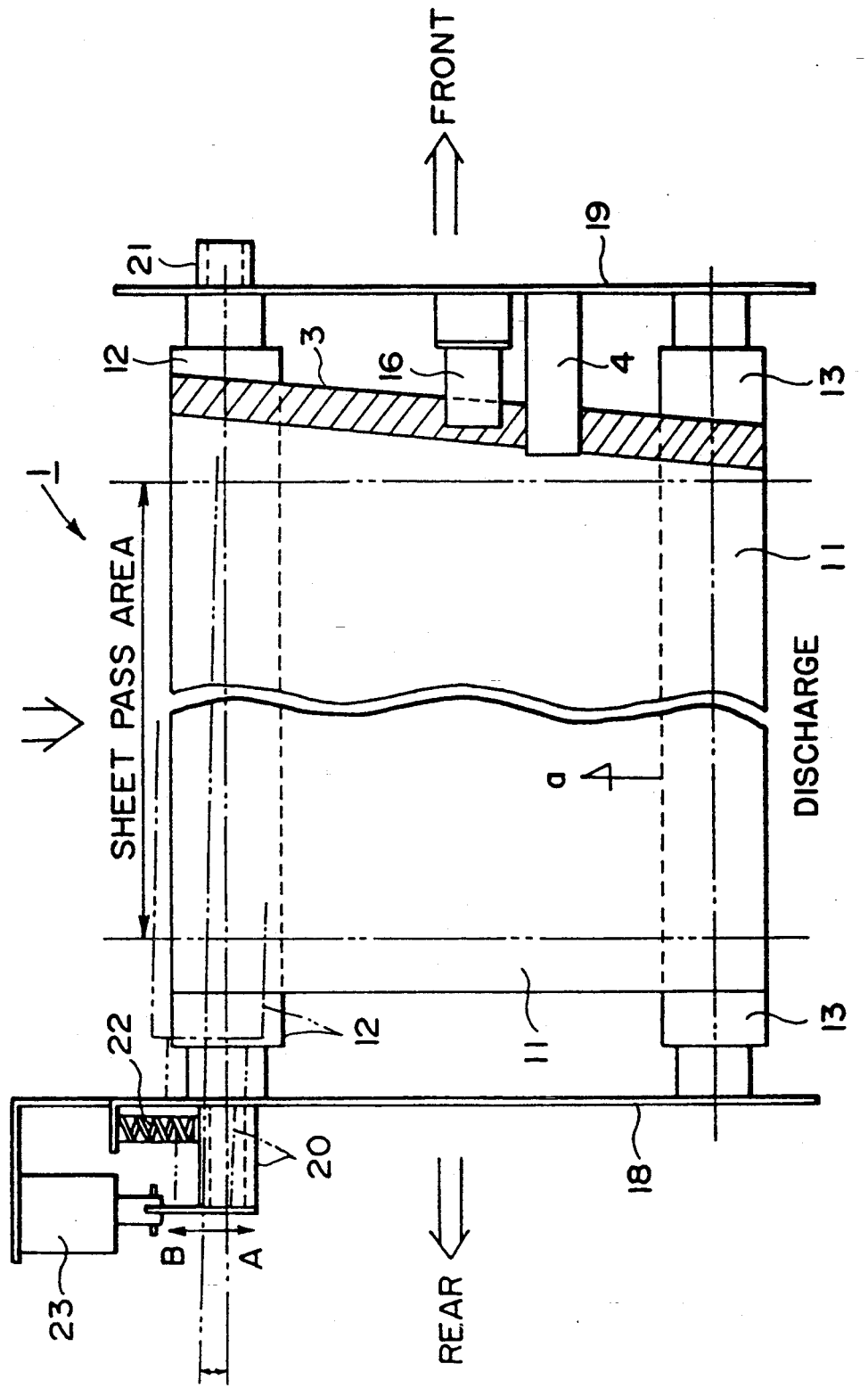
FIG. 1 is a partial top plan view of an example of an image fixing apparatus using a lateral shift control device according to an embodiment of the present invention.
Figure 2:
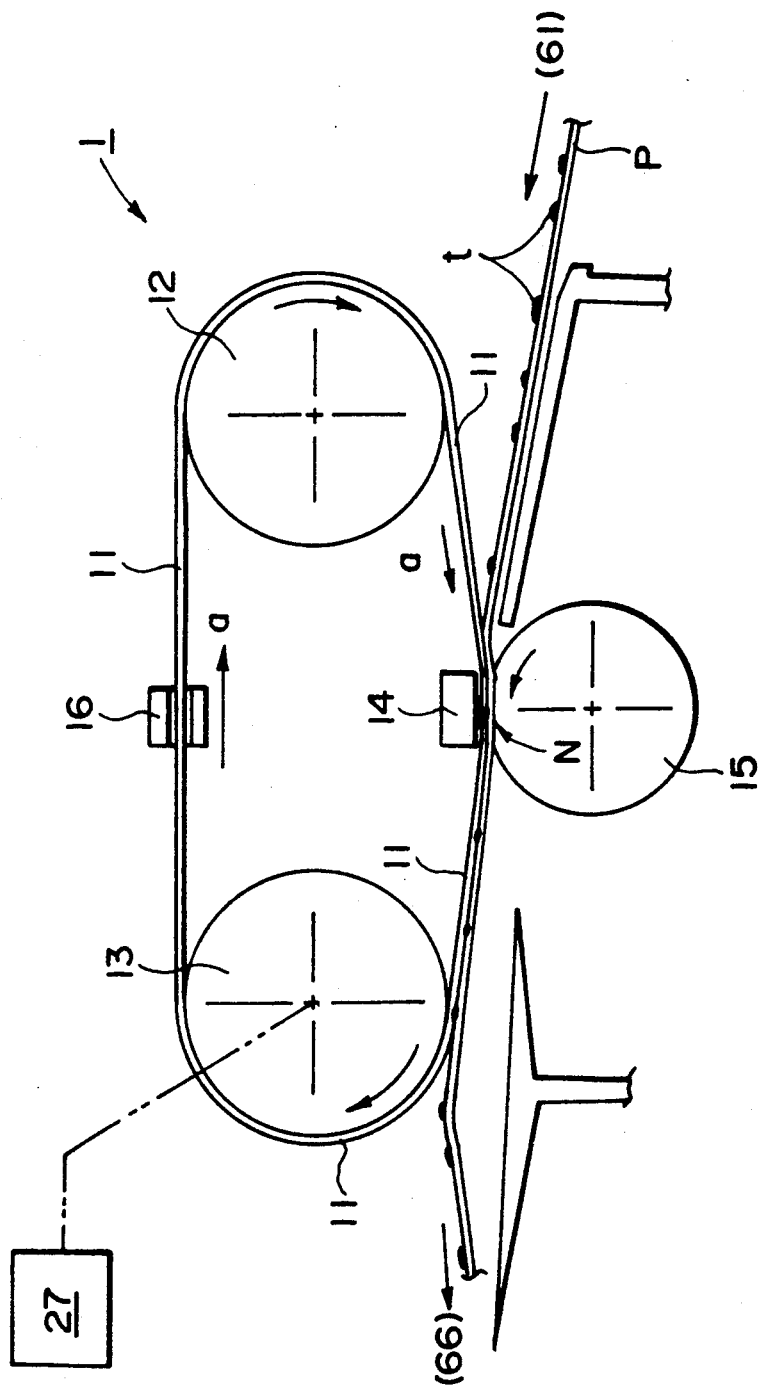
FIG. 2 is a side view of the apparatus of FIG. 1.

Referring to FIG. 1, there is shown an image fixing apparatus using an endless film provided with a lateral control system according to an embodiment of the present invention. FIG. 2 is a side view of the apparatus, and FIG. 3 is sectional view of an image forming apparatus incorporating the fixing apparatus of FIG. 1

Figure 3:
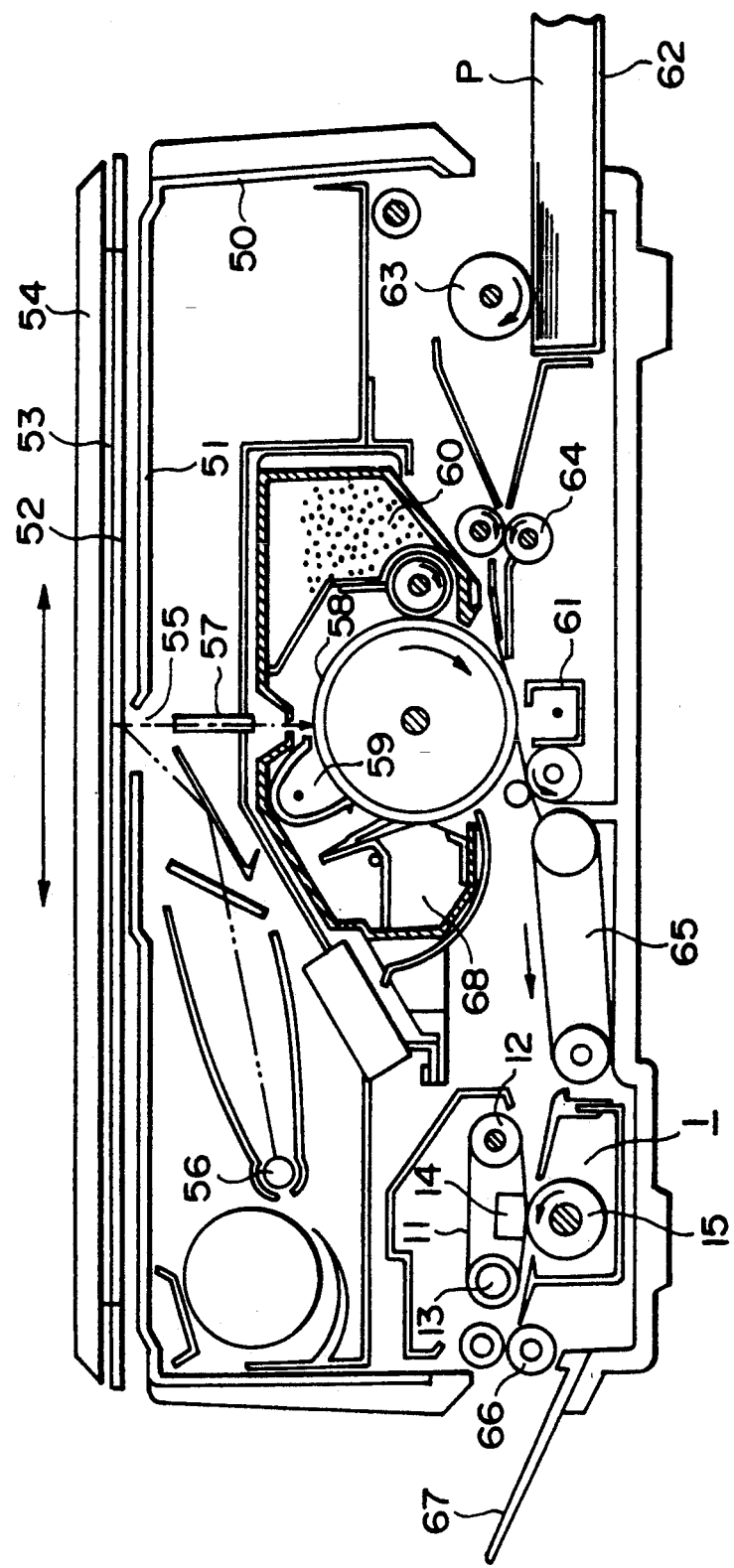
FIG. 3 is a sectional view of an image forming apparatus using the image fixing apparatus of FIGS. 1 and 2.

Referring first to FIG. 3, the description will be made as to an image forming apparatus of an electrophotographic type. The image forming apparatus comprises a reciprocable original supporting platen 52 in a top plate 51 of the casing 50. The original supporting platen is reciprocated through an unshown driving mechanism. An original 53 to be copied is placed down on the top surface of the original supporting plate 52, and is set thereon by an original covering plate 54.

The surface of the original 53 facing downward is illuminated through a slit by an illumination system 55 in a forward or backward stroke of the original supporting platen 52. Designated by a reference numeral 56 is an illuminating light source.

The light reflected by the original is sequentially imaged on a surface of a photosensitive drum 58 through an imaging lens (short focus imaging element array) 57, the photosensitive drum rotating in synchronism with the scanning of the original image.

The photosensitive drum 58 is uniformly charged to a positive or negative polarity by a discharger 59, and then is exposed to the image light, so that an electrostatic latent image is sequentially formed on the peripheral surface of the drum in accordance with the original image.

The surface of the photosensitive drum 58 now having the latent image is developed by a developing device 60 with powdery toner.

The developed image on the photosensitive drum 53 reaches the position of the transfer discharger 61 with continued rotation of the drum.

On the other hand, a recording material P is fed from a recording material cassette 62 into the copying machine by a pick-up roller 63, and is stopped by a nip formed between registration rollers 64 which are at this time not rotating. At a predetermined timing in synchronism with rotation of the photosensitive drum 58, the registration rollers 64 begin to rotate, by which the recording material P is fed toward the photosensitive drum 58 along the guiding members. It is introduced into the image transfer position between the photosensitive drum 58 and the transfer discharger 61, by which the developed image on the photosensitive drum 58 is sequentially transferred onto the recording material P.

The recording material P now having the transferred image is separated from the surface of the photosensitive drum 58 by an unshown separating means and is then introduced by a conveying system 65 into an image fixing apparatus 1 where it is subjected to an image fixing operation. Finally, it is discharged onto an outside discharge tray 67 by discharging rollers.

The surface of the photosensitive drum 58 after the image transfer is cleaned by a cleaning device 68.

The image forming apparatus is openable into top and bottom units with the boundary which is substantially the same as the recording material conveying path, and when the apparatus is opened or when a jam occurs, a main switch is opened. If the apparatus is closed after the maintenance or jam clearance operation, the main switch is closed.

The description will now be made as to the fixing apparatus 1. In FIGS. 1 and 2, an endless film driving roller 13 and a follower roller 12 functioning also as a tension roller are extended parallel to each other. An endless film 11 is stretched around the rollers 13 and 12. The driving roller 13 is driven by a driving system including a driving motor 27 in a clockwise direction indicated by an arrow a, by which the endless film 11 is rotated in the clockwise direction at a predetermined peripheral speed.

The film 11 has a total thickness of 100 microns, preferably not less than 40 microns and has a heat durability. It comprises, in this embodiment, a base film having a thickness of approximately 20 microns and made of PI (polyimide), PEI (polyether imide), PES (polyether sulfide), PFA (perfluoroalkoxy) or the like and a parting layer of PTFE (polytetrafluoroethylene) at an image contacting side, the parting layer having a thickness of approximately 10 microns.

A heater 14 is fixed on a frame of the image fixing apparatus in contact with an inside of a bottom travel of the endless film 11. The heater 14 is elongated or linear extending in a direction crossing with a direction of movement of the film 11. The heater is supplied with electric power to generate heat.

A pressing roller 15 has a rubber elastic layer made of silicone rubber or the like having a good parting property. The pressing roller 15 is urged to the bottom travel of the endless film 11 toward the heater 14 by an unshown urging means with a total pressure of 4–5 kg. The pressing roller rotates together with the movement of the film and at the same peripheral speed as the film in the same direction.

A recording material P carrying an unfixed toner image t (heat-fusible toner image) is carried from the transfer position 61 (FIG. 3) to the fixing apparatus 1 by conveying means 65. The recording material P is introduced into the nip (fixing nip) formed between the endless film 11 and the pressing roller. Then, it is moved in close contact with the fixing film 11 surface which moves at the same speed as the recording material P. During the passage through the nip, the toner image on the recording material P is heated by the heat from the heater 14 through the film, by which at least the surface region of the toner image t is completely softened and fused to as to be heatfixed on the recording material P surface. The recording material P having passed through the fixing nip N is then separated from the surface of the film 11 by the curvature of the film along the roller 13, when the recording sheet passes by the film driving roller 13.

The description will be made as to the lateral shift control mechanism for the endless film. As shown in FIG. 1, the driving rollers 13 and the follower rollers 12 are supported by bearings in a front plate 19 and a rear plate 18 of the fixing apparatus 1. Designated by reference numerals 21 and 20 are bearings in the front and rear plates, respectively, of the follower roller 12.

When the driving roller 13 is driven to move the film 11 in the direction indicated by an arrow, the film laterally moves toward right or left from the initial position of the film 11 indicated by the solid lines in FIG. 1, to such an extent that a lateral end of the film is rubbed with the front or rear plate 18 or 19. The lateral shifting is attributable to the positional errors of the rollers 13 nd 12 and the heater 14 in X, Y and Z axis directions. The lateral shifting is produced as long as the parallelism errors among the driving roller 13, the follower roller 12, the heater 14 and the pressing roller 15 in the X, Y and Z directions are not equal to zero.

In this embodiment, the bearing 20 of the follower roller 12 at the rear side is movable in the front-rear direction as indicated by arrows A and B relative to the plate 18. It is normally urged by a compression spring 22 in the direction A and is stopped by an unshown stopper at a first position. It is connected with a plunger of a solenoid 23 so that upon energization of the solenoid, the bearing 20 is moved in the direction B against the spring force of the compression spring 22 to be moved to the second position indicated by chain lines.

In this manner, by the energization and deenergization of the solenoid, the parallelism of the follower roller 12 is changed relative to the driving roller 13 and the heater 14.

In this embodiment, when the bearing 20 is at the first position (solenoid 23 is not energized), the film 11 tends to shift toward left in the film width direction when it is traveled around the members 13, 12 and 14, in other words, toward the rear side of the rollers 13 and 12. On the contrary, when the solenoid 23 is actuated so that the bearing 20 is at the second position indicated by chain lines, the film 11 tends to move rightwardly, that is, toward the front side of the rollers 13 and 12.

A photosensor 16 detects the lateral shift of the film. As shown in FIG. 1, adjacent a front side lateral end of the film 11, a mask is provided around the circumference of the film to block the light of the photosensor 16, as indicated by hatching line.

In this embodiment, the photosensor 16 is of a photointerruptor type. If the photosensor 16 is of a reflection type, the end of the film 11 may be provided with reflection material In this embodiment, the masking is provided only at one lateral side of the film 11, but it may be formed over the entire film.

A cleaning member 4 cleans the lateral end portion of the film. If the end portion of the film is contaiminated, erroneous reading of the film position may occur if the reflection type sensor is used for example. To avoid this, the lateral end portion of the film is always cleaned. In this embodiment, the cleaning member is formed of felt, but it may be another material if it has cleaning effect.

Figure 4:
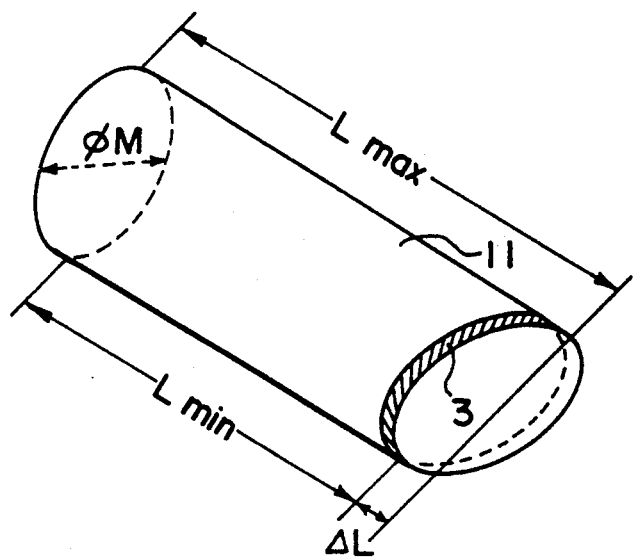
FIG. 4 shows an outer appearance of an endless film.

FIG. 4 shows an outer configuration of the film. As described hereinbefore, it is of an endless belt, and the diameter is $\phi M$. As shown in the Figure, the film 11 is cut inclinedly at lateral end (front side end). The maximum longitudinal length is Lmax and the minimum length is Lmin. Then, the inclined cut of the film 11 has a dimension of Lmax−Lmin=ΔL (inclined cut). The inclined cut, as shown in FIG. 1, is disposed at the front side of the fixing apparatus to detect the position of the film 11 by the photosensor 16.

Figure 5:
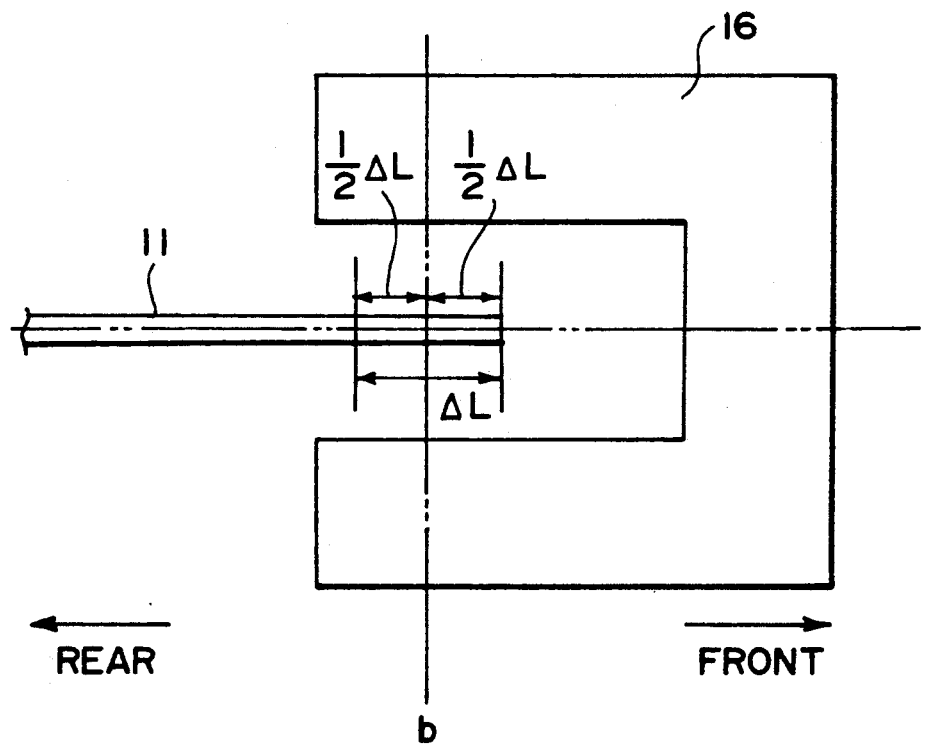
FIG. 5 shows a relationship between film sensors and film position.

FIG. 5 shows in detail the positional relation between the photosensor 16 and the film 11. In this embodiment, the photosensor 16 is a transparent type, and the detecting position is indicated by a reference b. Then, if the position of the film 11 is moved toward the rear beyond the position b, the photosensor 16 is actuated, and if it is moved toward the front side beyond the position b, the photosensor 16 is not actuated. The inclined cut portion of the film 11 is at the detecting position b.

Figure 12:
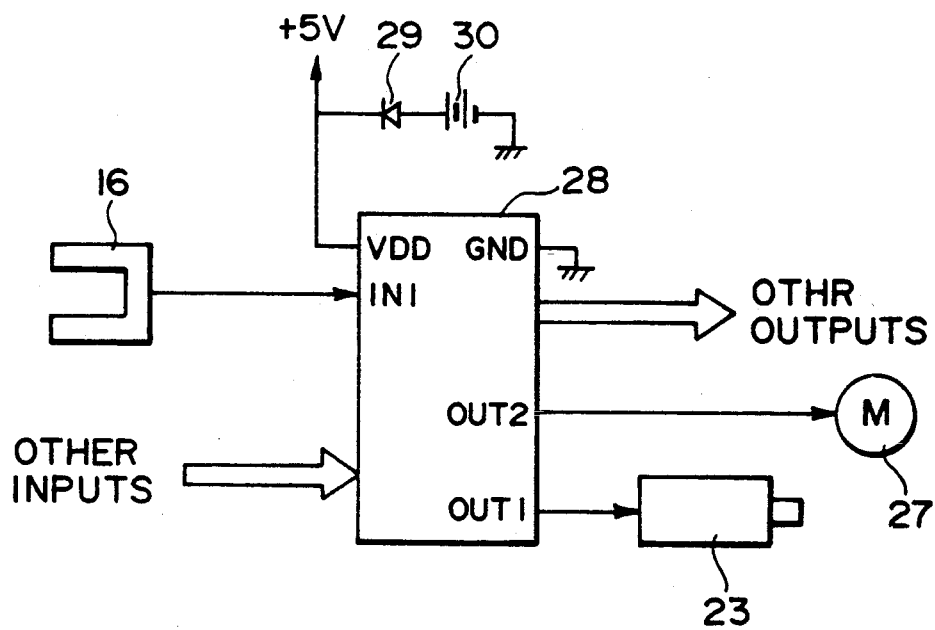
FIG. 12 is a schematic diagram of an electric control system according to a second embodiment.

By such an arrangement, when the film 11 moves in the direction indicated by an arrow a shown in FIG. 12, the photosensor 16 repeats on and off. In addition, depending on the lateral shift amount of the film, the ratio of on-duration and off-duration (duty ratio) changes.

In FIG. 5, the film is shown as being positioned such that the center of the inclined cut of the film 11 is at the detecting position b of the photosensor (reference position).

Figure 6:
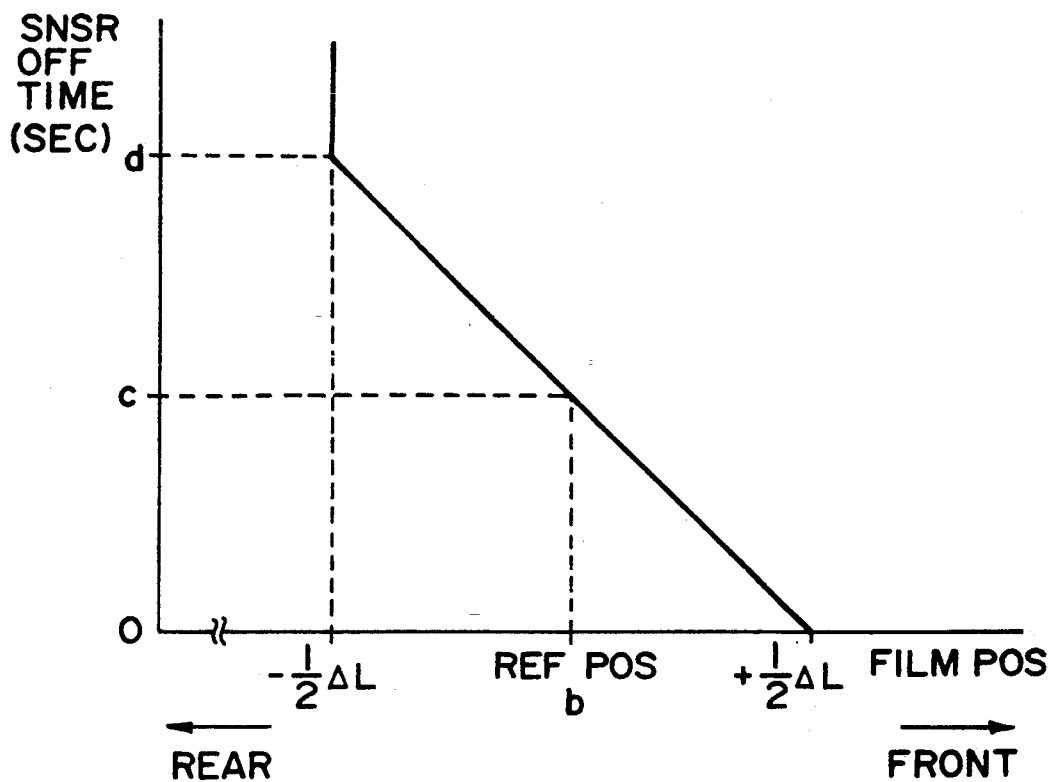
FIG. 6 is a graph of film position vs. film sensor output.

FIG. 6 is a graph showing a relation between the film position and the off-duration of the photosensor 16 relative to the reference position. As will be understood from FIG. 6, when the film 11 is at the reference position b, the off-duration of the photosensor 16 is c sec. When the film 11 is deviated to the front beyond the reference position b by not less than ΔL/2, the off duration of the photosensor 16 is 0 sec.

On the contrary, when the film 11 is laterally deviated toward rear from the reference position by not less than ΔL/2, the photosensor 16 continues to be off.

Immediately before the film 11 is deviated to such an extent that the photosensor 16 continues to be off, the off-duration is d sec. This is considered as being equivalent to the time period required for the film 11 to rotate through one full-turn. The off-duration c sec. is approximately one half the off-duration d sec. because it corresponds to the center of the inclined film cut.

With this arrangement, when the continuous off-duration of the photosensor 16 becomes longer than (¾)d sec which is shorter than d sec. and longer than d/2 sec., the solenoid 23 is energized. On the contrary, when it becomes (¼)d which is shorter than d/2 sec., the solenoid 23 is deenergized. The energization and the deenergization are repeated during the film drive.

Accordingly, the endless film reciprocates within a predetermined range and does not laterally shift beyond the range.

Figure 7:
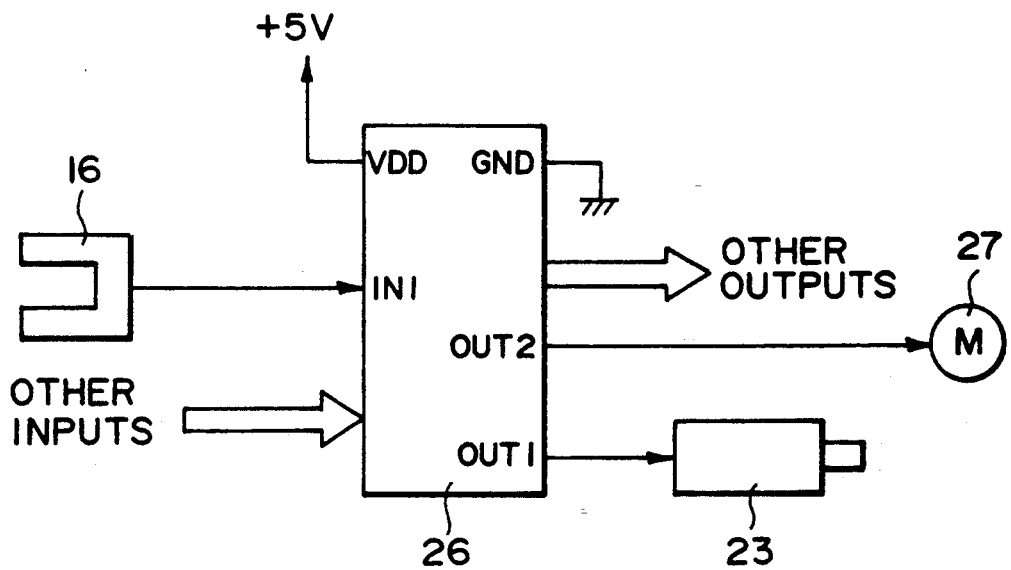
FIG. 7 is a schematic diagram for an electric control system in a first embodiment.

FIG. 7 shows the lateral shift control system. A microcomputer 26 has an input terminal IN1 to which the photosensor 16 is connected, and an output terminal OUT1 to which the solenoid 23 is connected. It also comprises an output terminal OUT2 from which a rotation control signal for the motor 27 for driving the fixing apparatus is produced.

To a VDD terminal, +5 V voltage source is connected, and GND terminal is electrically grounded.

Although not shown, it is also provided with terminals for receiving and producing signals to and from the copying machine using the fixing apparatus. The microcomputer 26 comprises ROM and RAM having a copying sequential operation program or the like and a non-volatile memory RAM which does not loose the memory even if by the power supply to the microcomputer 26 is shut due to the deactuation of the main switch of the apparatus, or due to the deactuation of the main switch by the opening of the apparatus as described hereinbefore.

Figure 8:
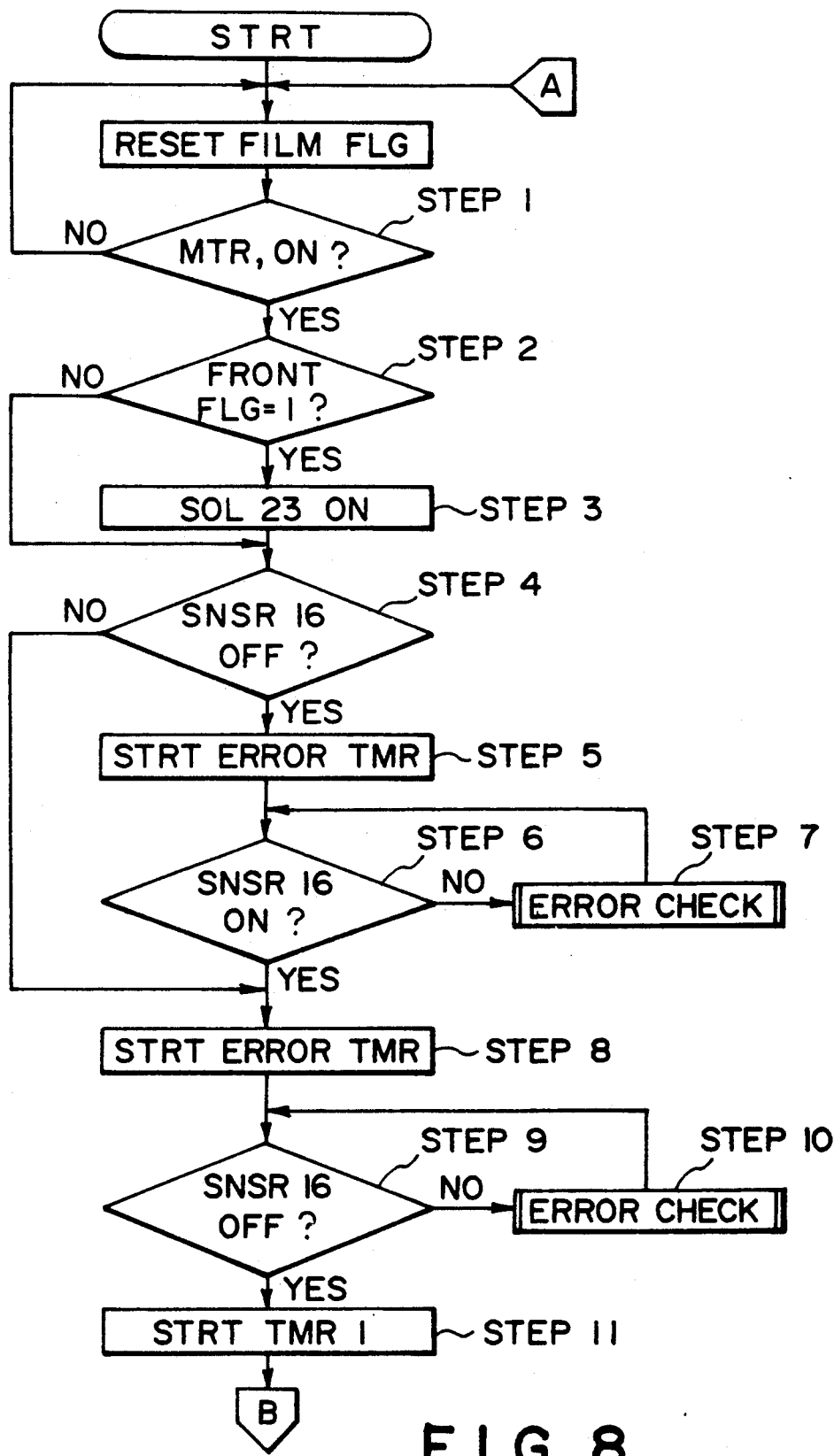
FIGS. 8-11 are flow charts of a lateral shift control program according to a first embodiment.

FIGS. 8–11 are flow charts of the programmed film lateral shift control operations in the fixing apparatus of this embodiment. This program is also contained in the ROM of the microcomputer 26. This program is accessed by the main sequence program at regular intervals or as desired. After the start, the discrimination is made as to whether or not the motor 27 is actuated, at step 1 (FIG. 8). If so, step 2 is executed. If not, the operation returns to step 1 and waits for actuation of the motor 27.

At step 2, the discrimination is made as to whether the film lateral shift control has been effected toward the front side or not. In this embodiment, the memory in a predetermined address of the non-volatile RAM in the microcomputer 26 is set to the front side flag. The above discrimination is made using this, that is, if the memory is 1 which indicates that the past control is toward the front side, a step S3 is executed where the solenoid 23 is actuated, and the lateral shift is set to the front side. Then, the step 4 is executed. If, at step 2, the front side flag is zero, which indicates that the past control is toward the rear side, the step 4 is executed. At step 4, the discrimination is made as to whether or not the sensor is actuated. If the sensor 16 is actuated, step 8 is executed. If it is not actuated, step 5 is executed. At step 5, an error timer is reset to zero, and starts measurement, and thereafter, step S6 is executed.

At step 6, the discrimination is made as to whether the sensor 16 is actuated or not. If not, the operation proceeds to step 7.

At step 7, an error check routine is executed, and the operation returns to step 6.

Figure 9:
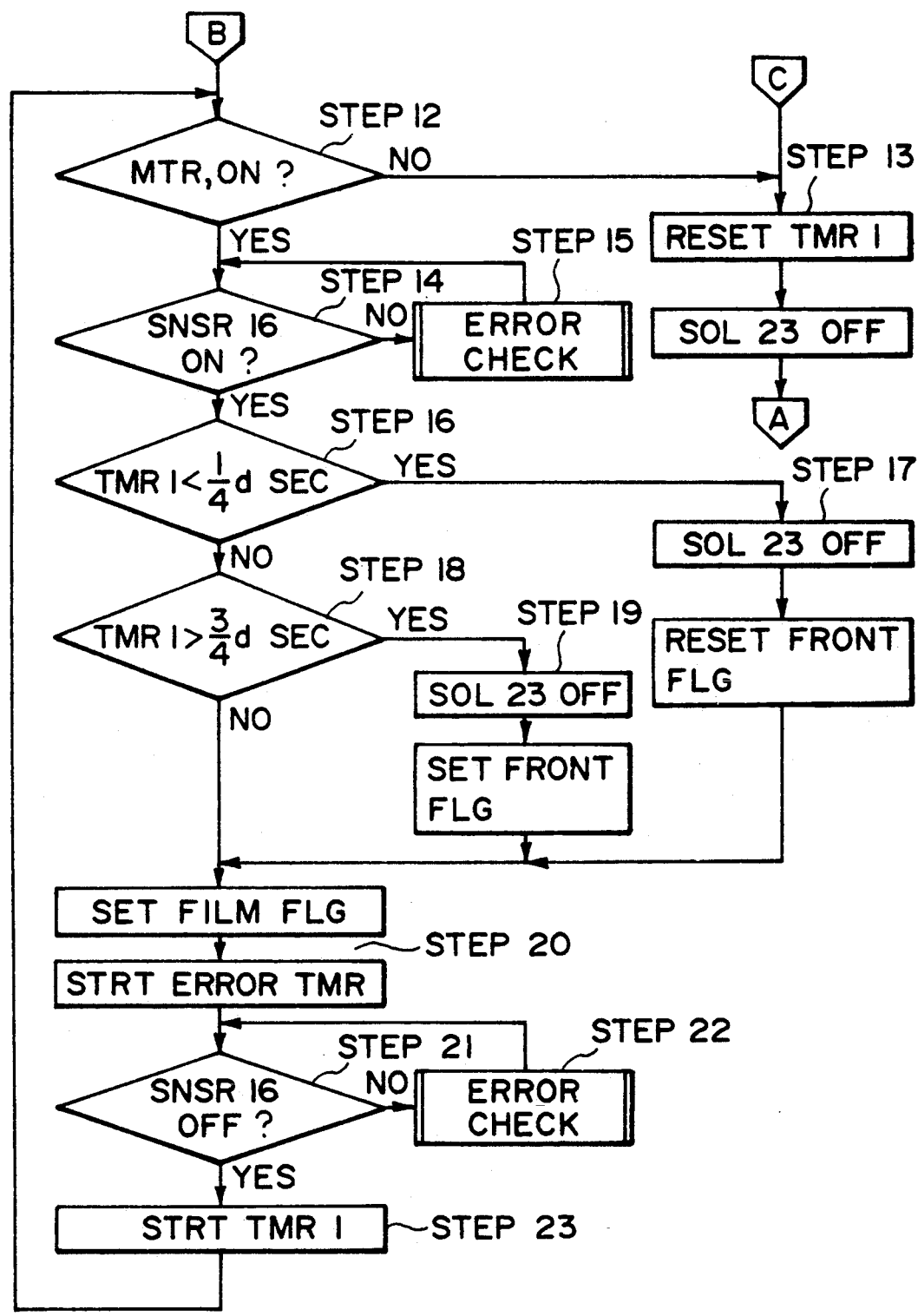
Figure 10:
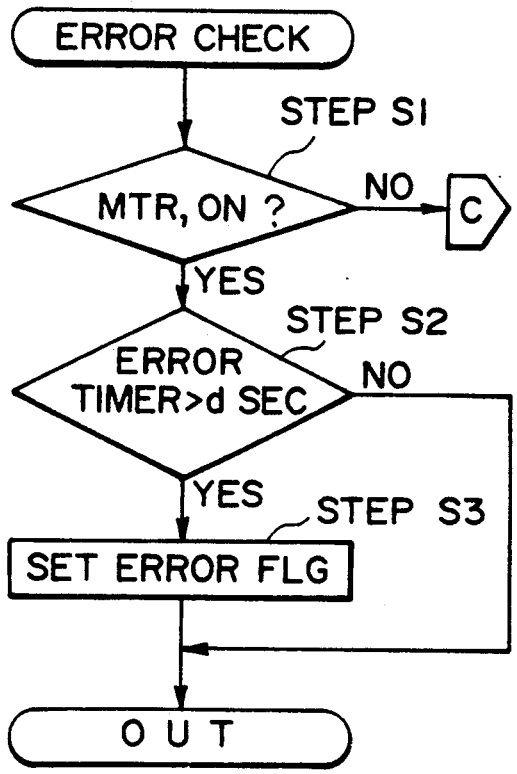

Referring to FIG. 10, the error check routine will be described. First, at step S1, the discrimination is made as to whether or not the motor 27 is energized. If so, step S2 is executed. If not, the operation proceeds to step 13 (FIG. 9). At step S2, the discrimination is made as to whether or not the content of the error timer is smaller or larger than d sec. If it is smaller, the operation skips to the outlet of this routine. If, at step S2, the error timer count is larger than d sec., step S3 is executed.

At step S3, the error flag is set, and the operation skips to the outlet of the routine.

At step 6, if the sensor 16 is actuated, step S8 is executed where the error timer is reset to zero, and also, the measurement is started. Then, step 9 is executed. At step 9, the discrimination is made as to whether the sensor 16 is deactuated or not. If it is not off, the operation proceeds to step 10 where the error check routine is executed, and the operation returns to step 9. When the sensor 16 is deactuated, the operation proceeds to step 11 where the timer count is reset to zero, and also starts to the measurement. Then, step 12 (FIG. 9) is executed.

At step 12, the discrimination is made as to whether or not the motor 27 is actuated. If so, the operation proceeds to step 14.

At step 14, the discrimination is made as to whether or not the sensor 16 is actuated. If so, the operation proceeds to step 15 where the error check routine is executed, and the operation returns to step 14. If the sensor 16 is actuated, step 16 is executed.

At step 16, the discrimination is made as to whether the count of the timer 1 is smaller than d/4 sec. or not. If so, the film 11 is deemed to have been deviated toward front side. Then, the operation proceeds to step 17 where the solenoid 23 is deenergized to switch the lateral shifting direction to the rear side. The front flag is reset to zero, and the operation proceeds to step 20.

At step 16, if the count of the timer 1 is not smaller than d/4 sec. the operation proceeds to step 8. At step 18, the discrimination is made as to whether or not the count of the timer 1 is larger than 3 d/4 sec. If not, the operation proceeds to step 20. If it is larger, the film 11 is deemed to have been deviated toward the rear. Then, step 19 is executed by which the solenoid 23 is energized to switch the lateral shift direction to the front side. In addition, the front flag is set to 1, and the operation proceeds to step 20.

At step 20, the error timer is reset to zero, and starts measurement. Then, the operation proceeds to step 21.

At step 21, the discrimination is made as to whether or not the sensor 16 is deactuated. If it is not deactuated, the operation proceeds to step 22 where the error check routine is executed, and returns to step 21. At step S21, if the sensor 16 is deactuated, the operation proceeds to step 23 where the timer 1 is reset to zero, and starts measurement. Then, the operation returns to step 12.

If the motor 27 is not actuated in the step 13, the operation proceeds to step 13 where the measurement of the timer 1 is stopped, and is reset to zero, and then the solenoid 23 is deenergized. Then, the operation returns to step 1.

Figure 11:
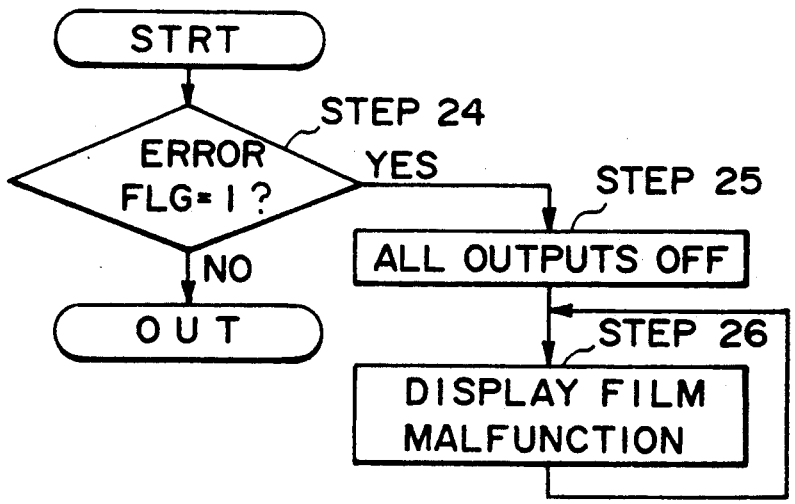

FIG. 11 is a flow chart of a film malfunction clearance program which is a part of the main program. Here, the discrimination is made at step 24 as to whether the error flag is set or not. If not, the operation skips to the outlet, and the subsequent main sequence program is executed.

If the error flag is set at step 24, the operation proceeds to step 25 where all the outputs of all of the apparatus (copying machine in this embodiment) are rendered off. Then, the operation proceeds to step 26 where the film malfunction is displayed. The step 26 is made as a permanent loop to prohibit execution of the main program.

As described in the foregoing, the endless film 11 of the fixing apparatus of this embodiment is controlled by the solenoid 23 upon the rotation of the motor At this time, the solenoid 23 is controlled in accordance with the content of the non-volatile RAM which stores the controlling lateral shift direction immediately before the past stoppage. Then, during the motor rotation, when the sensor 16 is not actuated, the switching to the off-state is awaited. And, when the sensor 16 is off, the switching to the on-stage and subsequent switching to the off-state is awaited. B doing so, the timing at which the output of the film position sensor 16 changing from the on-state to the off-state is detected. This is an end of the initial setting. Then, the period from the off-duration of the sensor 16 until the switching to the on-state is counted to detect the position of the film.

Since the control of the film 11 is not possible until the initial counting of the off-duration of the sensor 16, the lateral shifting direction is set to be equal to the previous direction, by which the abnormal lateral shifting of the film is prevented during the uncontrollable period. Subsequently, the off-duration of the sensor 16 from the switching of the sensor 16 from the on-state to the off-state to the switching thereof from the off-state to the on-state is counted. On the basis of this count, the control is effected so as to maintain the predetermined range of the film position.

In this embodiment, the sensor has been a transparent type, but it may be of another type such as a microswitch or a reflection type photosensor.

Referring to FIG. 12, another embodiment will be described. FIG. 12 schematically shows a electric control, and the other structure of the apparatus of this embodiment is the same as embodiment 1. A microcomputer 28 has an input terminal IN1 which is contacted to a photosensor 16 for detecting the position of the film and an output terminal OUT1 which is connected to the solenoid 23. Similarly to FIG. 7 of the first embodiment, it has an additional output terminal OUT 2 which produces rotation control signal for the motor for driving the fixing apparatus.

To a VDD terminal, a voltage source of +5 V is connected, and simultaneously, a battery 30 is connected through a diode 29. A GND terminal is grounded.

It also comprises terminals for the other input and output signals in connection with the copying machine using the fixing apparatus of this embodiment. The microcomputer 28 includes ROM and RAM in which the sequential operation program for the copying operation. As contrasted to the foregoing embodiment, no volatile RAM is included. However, even if the voltage source of +5 V is shut-off, the battery 30 supplies electric power, and therefore, the content of the RAM in the microcomputer 28 remains.

FIGS. 13, 14, 15 and 16 illustrate a third embodiment. In this embodiment, the solenoid 23 of the first embodiment is replaced with a monostable latching solenoid 31.

Figure 13:
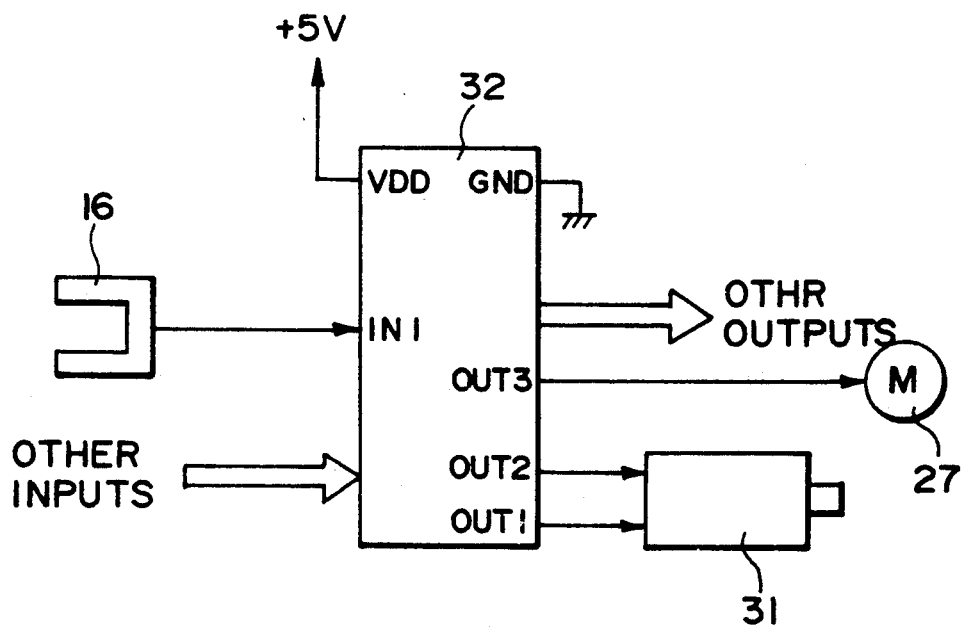
FIG. 13 is a schematic diagram of a control system according to a third embodiment.

FIG. 13 shows an electric control system. A microcomputer 32 has an input terminal IN1 to which the photosensor 16 for detecting the position of the film 11 is connected, and output terminals OUT1 and OUT2 to which the monostable latching solenoid 31 (latching solenoid) is connected. It is a double coil type, and the coil for attraction is connected to the terminal OUT1 and the releasing coil is connected to the terminal OUT2. The microcomputer has another terminal OUT3 which produces a rotation control signal for the motor for driving the fixing apparatus.

To the VDD terminal, the voltage source of +5 V is connected, and the GND terminal is grounded.

The microcomputer further comprises, although not shown, terminals for the other input and output signals for the copying machine using the fixing apparatus of this embodiment. In the microcomputer 32, there are ROM and RAM or the like in which the sequential operation program is contained for the copying operation of the copying machine.

The description will be made as to the latching solenoid 31. The solenoid has an permanent magnet. When the attraction coil is supplied with voltage to pull the plunger, the plunger is retained by the permanent magnet, and therefore, the voltage application to the attraction coil is not required. When the voltage is applied to the releasing coil, the magnetic force for neutralizing the magnetic force of the permanent magnet is produced, and therefore, the retention of the attraction is released by the compression spring 22 as shown in FIG. 1. In this case, too, the voltage application to the releasing coil after the release is not required. Accordingly, pulse voltage application is sufficient to energize the latching solenoid. In this embodiment, the pulse voltage has a pulse width of 100 ms.

Figure 14:
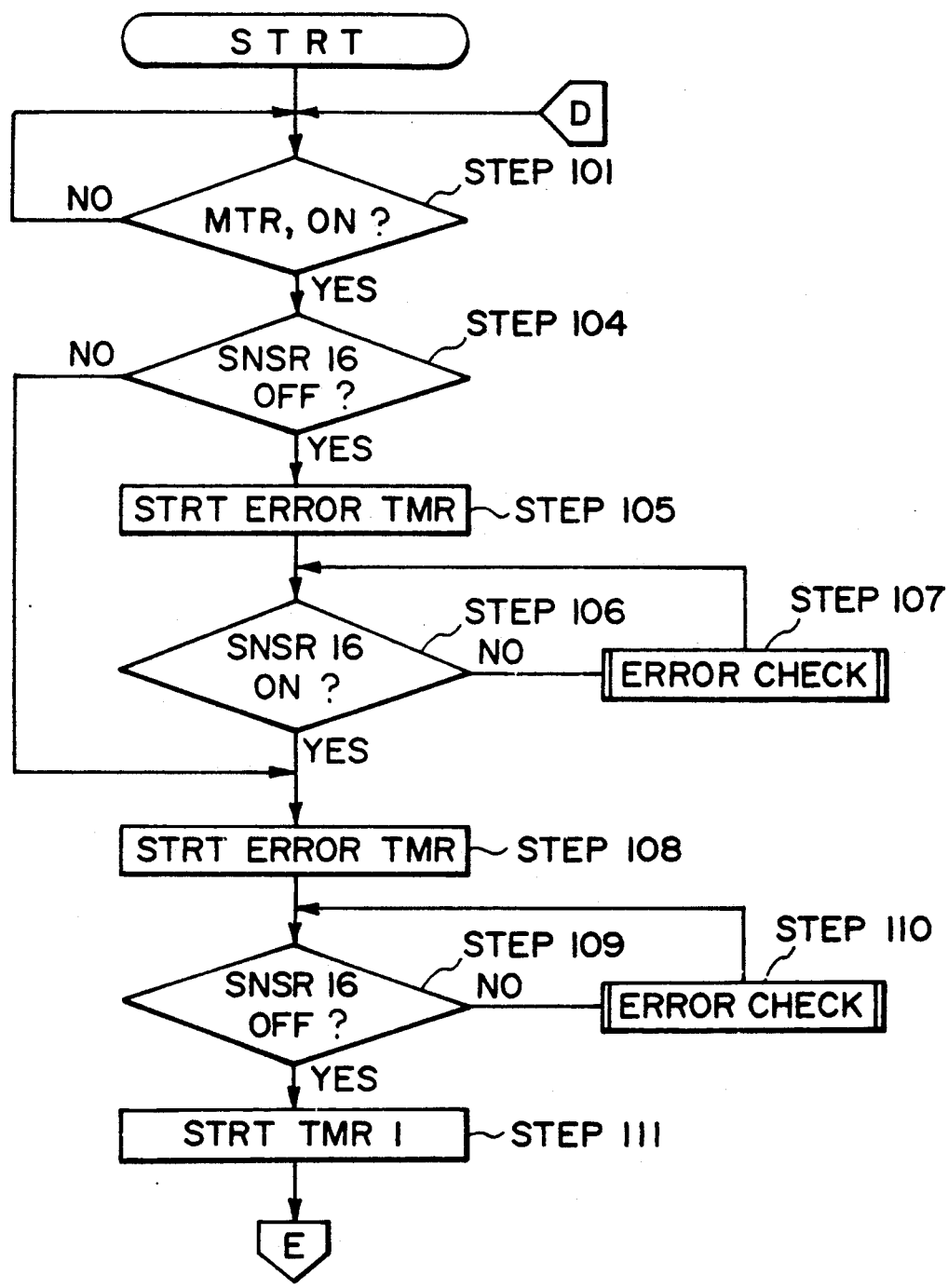
FIGS. 14-16 are flow charts of a lateral control system program according to a third embodiment.
Figure 15:
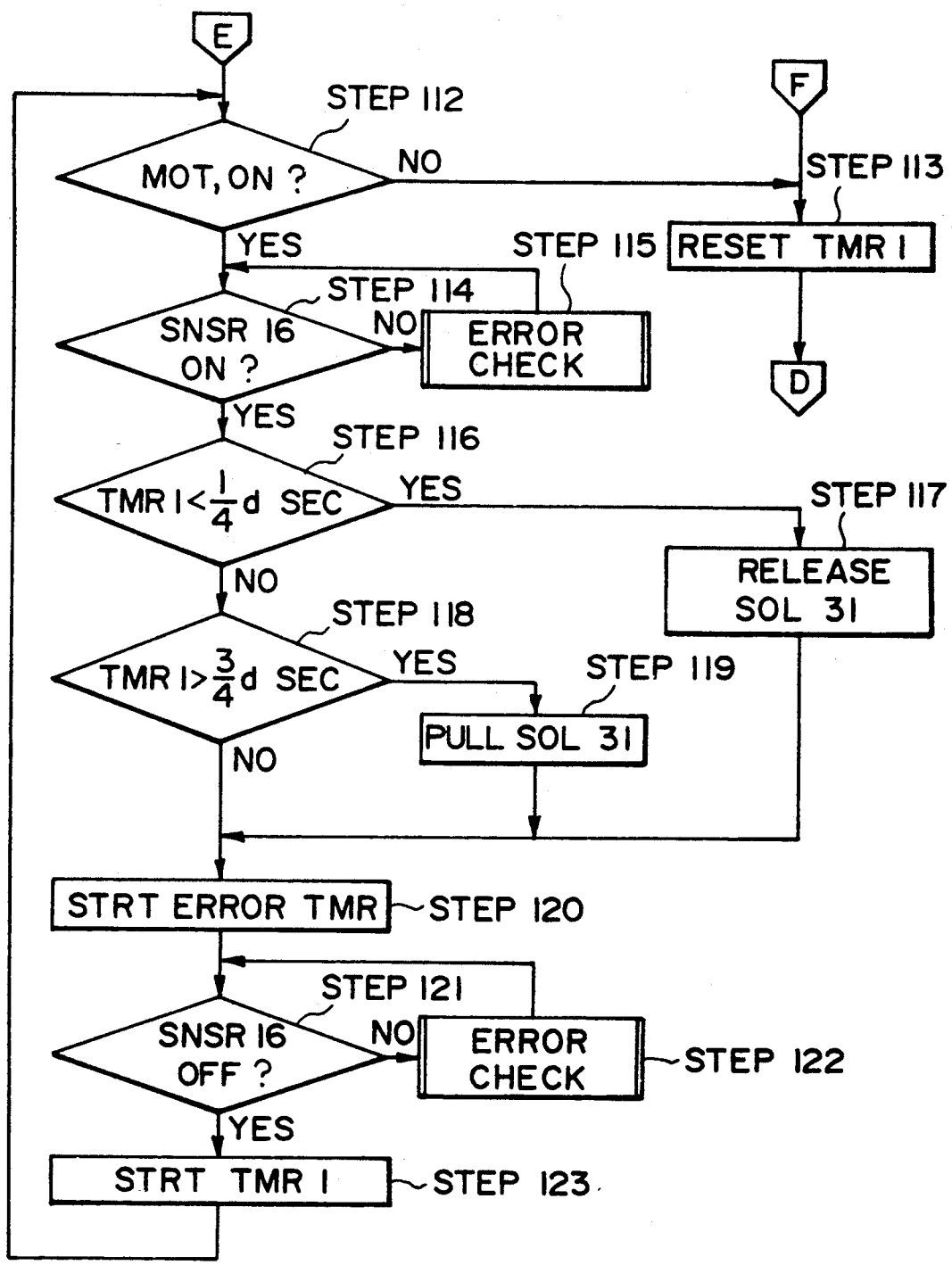
Figure 16:
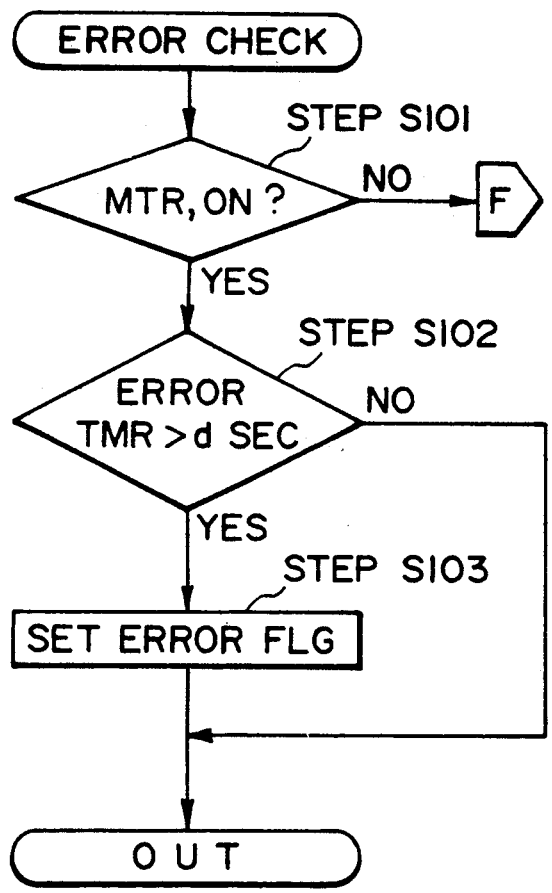

FIGS. 14, 15 and 16 are flow charts for the film lateral shift control program.

The program is also contained in the ROM in the microcomputer 32, and is accessed at regular intervals or as desired by the main sequential operation program, to be executed.

After the start, at step 101 (FIG. 14), the discrimination is made as to whether the motor 27 is actuated.

If the motor 27 is actuated, step 104 is executed, and if not the operation returns to step 101, and the actuation of the motor 27 is awaited.

At step 104, the discrimination is made as to whether or not the sensor 16 is actuated. If not, the step 108 is executed. If so, the step 105 is executed.

At step 105, the error timer is reset to zero, and the counting is started, and then step 106 is carried out.

At step 106, the discrimination is made as to whether or not the sensor 16 is actuated. If not, the operation proceeds to step 107.

At step 107, the error check routine is executed, and the operation returns to step 106.

Referring to FIG. 16, the error check routine will be described. First, at step S101, the discrimination is made as to whether or not the motor 27 is actuated. If so, step S102 is executed. If not, step 113 (FIG. 15) is executed. At step S102, the discrimination is made as to whether or not the count of the error timer is larger than d sec. If it is smaller, the operation skips to the outlet of this routine. If the count of the error timer is larger than b sec. at step 102, a step 103 is executed.

At step 103, the error flag is set, and the operation skips to the outlet of the routine.

If the sensor 16 is actuated at step 106 (FIG. 14), the operation proceeds to step 107 where the count of the error timer is reset to zero, and the counting is started, and then the operation proceeds to step 109.

At step 109 the discrimination is made as to whether or not the sensor 16 is deactuated or not. If not deactuated, the operation proceeds to step 110, where the error check routine is executed, and step 109 is then executed. When the sensor 16 becomes off, the step 111 is executed whether the count of the timer 1 is reset to zero, and the counting is started, and then the operation proceeds to step 112 (FIG. 15).

At step 112, the discrimination is made as to whether or not the motor 27 is actuated. If so, the operation proceeds to step 114.

At step 114, the discrimination is made as to whether or not the sensor 16 is actuated. If not, the operation proceeds to step 115 where the error check routine is executed, and the operation returns to step 14. If the sensor is actuated, step 116 is executed.

At step 116, the discrimination is made as to whether or not the count of the timer 1 is smaller than d/4 sec. If so, the film 11 is deemed to have been shifted to the front side, and the operation proceeds to step 117 where the attraction releasing signal is supplied to the solenoid 31 by which the lateral shifting of the film 11 to the rear side, and the operation proceeds to step 120.

If the count of the timer 1 is not smaller than d/4 sec at step 116, the operation proceeds to step 118.

At step 118, the discrimination is made as to whether or not the count of the timer 1 is larger than 3d/4 sec. If not larger, the operation proceeds to step 120. If it is larger, the film 11 is deemed to have been shifted to the rear side, step 119 is executed by which an attraction drive signal is supplied to the solenoid 32, by which the film shifting direction is switched to the front side, and the operation proceeds to step 120.

At step 120, the count of the error timer is reset to zero, and the counting is started, and then the operation proceeds to step 121.

At step 121, the discrimination is made as to whether the sensor 16 is deactuated or not. If not, deactuated, the operation proceeds to step 112 where the error check routine is executed, and the operation returns to step 121.

If the sensor 16 is deactuated at step 121, the operation proceeds to step 123 where the count of the timer 1 is reset to zero, and the counting is started. Then, the operation returns to step 112.

If the motor 27 is deactuated at step 112, the operation proceeds to step 113 where the counting of the timer 1 is first stopped, and the count is reset to zero. Then, the operation returns to step 101 (FIG. 14).

The film malfunction clearance program which is a part of the main program is the same as in the first embodiment, and therefore, the description is omitted for simplicity.

As described in the foregoing, during the motor rotation, when the sensor 16 is actuated, the switching to the off-state is awaited. If the sensor 16 is deactuated, the switching to the on-state and the subsequent switching to the off-state are awaited. By detecting the timing at which the output of the film position sensor 16 switches from the on-state to the off-state, the initial setting ends. Then, the off-duration of the sensor 16 from the off-state of the sensor 16 to the on-state of the sensor 16 is counted, by which the position of the film 11 is first detected. Before the first off-duration measurement, the control of the film 11 is not possible. However, the latching solenoid 23 is set in the direction in which the previous control is effected, and therefore, the film is prevented during the uncontrollable period from abnormally shifting to one of the lateral directions. Thereafter, the off-duration of the sensor 16 from the switching of the sensor 16 from the on-state to the off-state to the switching from the off-state to the on-state, is measured, and on the basis of the measurement the film position is controlled within a predetermined range. By using the latching solenoid, only pulse voltage is sufficient to energize the solenoid, and therefore, the energy consumption can be lowered.

As described in the foregoing, even at the duration immediately after the main switch is actuated, the lateral shift control is started with the previously set direction. Thus during the uncontrollable period, the endless film is prevented from being shifted in one of the lateral directions to the extent of damage thereto, until the first film position control, on the basis of the detected lateral position of the film, is started.

Therefore even if there is speed difference depending on the shifting direction of the endless film, the lateral shift control becomes possible, and therefore, the tolerance of the endless film tension is enlarged with the result of latitude in the designing.

Figure 17:
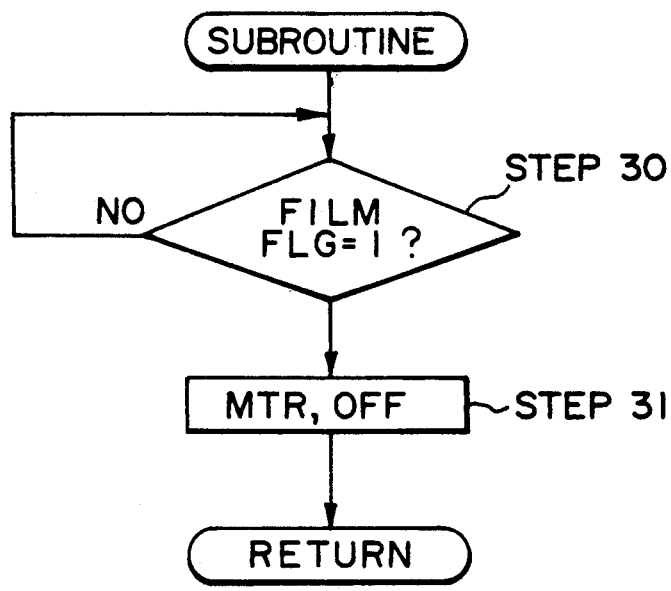
FIG. 17 is a flow chart of a control according to a fourth embodiment.

Referring to FIG. 17, a further embodiment will be described wherein stoppage of the rotation of the endless film is prohibited during a predetermined period after start of the rotation of the endless film.

FIG. 17 shows a sub-routine used when the motor is stopped by the sequential operation program.

In the sub-routine, the discrimination is made as to whether or not the film flag is set or not at step 30 when the motor is stopped. If it is not set, the setting is awaited. When it is set, the motor is deactuated. This is the end of this sub-routine. The film flag is set when the position of the film 11 is first detected after the motor is actuated. Therefore, the sub-routine prohibits the stoppage of the motor until the position of the film is first detected during the pre-rotation period or the sheet absent period, by which the position of the film is reset to the correct position.

As described above, at the start of the motor rotation the solenoid 23 is controlled in accordance with the content of the non-volatile RAM storing the controlled lateral shift direction in the past. Next, during the motor rotation, if the sensor 16 is actuated, the switching to the off-state is awaited. If the sensor 16 is deactuated, the switching to the on-state and the subsequent switching to the off-state are awaited, and the timing at which the output of the film position sensor 16 switches from the on-state to the off-state is detected, by which the initial setting ends. Next, the off-period of the sensor 16, until the sensor 16 is switched from the off-state to the on-state, is measured during which off-period film 11 position is first detected. Until the first off-duration period detection, the control of the film 11 is not possible. Therefore, the lateral shifting direction is set to the previous one, and during which the stoppage of the motor is prohibited. When the first off-duration is detected, and if the detected duration is smaller than $(\frac{1}{4})d$ or larger than $(\frac{3}{4})d$, the solenoid is controlled, and the prohibition of the stoppage of the motor is released. By doing so, even if the pre-rotation or sheet absent period or the like in which the motor is rotated for a period shorter than the period required for detecting the position of the endless film, is repeatedly occurred, the film is prevented from shifting abnormally during the uncontrollable period.

A further embodiment will be described. In the foregoing embodiment, the stoppage of the endless film rotation is prohibited until the film flag is set. However, in this embodiment, the stoppage of the motor is prohibited for a predetermined period of time after the start of the rotation of the endless film.

Figure 18:
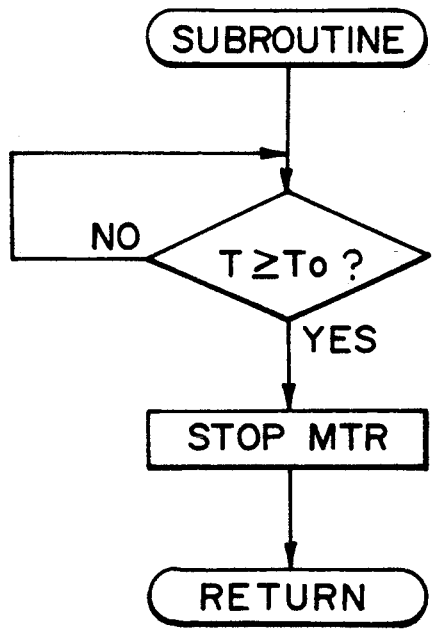
FIG. 18 is a flow chart of a control system according to a fifth embodiment.

In the film lateral shift control in FIGS. 8-11, if the sensor 16 is actuated during the motor rotation period, the switching to the off-state is awaited. If the sensor 16 is deactuated, the switching to the on-state and the subsequent switching to the off-state are awaited. The off-period of the sensor 16, until the sensor 16 state changes from the off-state to the on-state, is measured to detect the position of the film 11. This means that the position of the film 11 can be detected while the film rotates through two full-turns. That is, the stoppage of the film is prohibited until the film rotates through two turns (2d), by which the film position detected state is established. The sub-routine is shown in FIG. 18. The sub-routine shown in FIG. 18 is accessed at the time of motor stoppage. A timer T is reset when the motor starts to rotate. If the count of the timer T is smaller than a predetermined period T0 which is longer than 2d, the motor is stopped after the count reaches T0. The other processing is the same as in the foregoing embodiment.

In this embodiment, too, the extreme lateral shift of the endless belt can be prevented, even if the driving motor is actuated repeatedly only for short period of time.

In the embodiment, the endless belt is made of a thin film in order to reduce the waiting period, the lateral shift control system of this invention is applicable to a thick film endless belt.

While the invention has been described with reference to the structures disclosed herein, it is not confined to the details set forth and this application is intended to cover such modifications or changes as may come within the purposes of the improvements or the scope of the following claims.

What is claimed is:

1. A lateral shift control apparatus for an endless belt, said apparatus comprising:
   lateral shifting means for applying to the endless belt a lateral shifting force in lateral directions;
   switching means for switching the direction of the lateral shifting force by said lateral shifting means;
   means for storing the lateral shifting direction; and
   determining means for determining the direction of the lateral shifting force when power supply to the apparatus is started, in accordance with the lateral shifting direction stored in said storing means.

2. An apparatus according to claim 1, further comprising detecting means for detecting lateral shifting of the endless belt and control means for controlling said switching means in accordance with an output of said detecting means so as to limit the lateral shift of the endless belt within a predetermined range.

3. An apparatus according to claim 2, wherein said storing means stores the direction upon termination of the power supply.

4. An apparatus according to claim 3, wherein upon reconnection of the power supply, said control means controls said switching means to provide the shifting direction of said shifting means which is the same as the direction stored in said storing means.

5. An apparatus according to claim 2, wherein said detecting means detects one of lateral ends of the endless belt.

6. An apparatus according to claim 2, further comprising means for prohibiting stoppage of rotation of the endless belt for a predetermined period after start of rotation of said endless belt.

7. An apparatus according to claim 6, wherein said predetermined period is determined on the basis of time.

8. An apparatus according to claim 6, wherein said predetermined period is a period until said detecting means detects a position of the endless belt.

9. An apparatus according to claim 6, wherein said detecting means detects the position of the endless belt by rotation of the endless belt through a predetermined distance.

10. An apparatus according to claim 1, wherein said storing means includes a non-volatile memory means.

11. An apparatus according to claim 10, wherein said memory means comprises a static RAM.

12. An image fixing apparatus, comprising:
a heater;
an endless belt movable together with a material having a visualized image, wherein the visualized image is fixed by heat on the material from said heater through said endless belt;
lateral shifting means for applying to the endless belt a lateral shifting force in lateral directions;
switching means for switching the direction of the lateral shifting force by said lateral shifting means;
means for storing the lateral shifting direction; and
determining means for determining the direction of the lateral shifting force when power supply to the apparatus is started, in accordance with the lateral shifting direction stored in said storing means.

13. An apparatus according to claim 12, further comprising detecting means for detecting lateral shifting of the endless belt and control means for controlling said switching means in accordance with an output of said detecting means so as to limit the lateral shift of the endless belt within a predetermined range.

14. An apparatus according to claim 13, wherein said storing means stores the direction upon termination of the power supply.

15. An apparatus according to claim 14, wherein upon reconnection of the power supply, said control means controls said switching means to provide the shifting direction of said shifting means which is the same as the direction stored in said storing means.

16. An apparatus according to claim 13, wherein said detecting means detects one of lateral ends of the endless belt.

17. An apparatus according to claim 13, further comprising means for prohibiting stoppage of rotation of the endless belt for a predetermined period after start of rotation of said endless belt 18. An apparatus according to claim 17, wherein said predetermined period is determined on the basis of time.

19. An apparatus according to claim 17, wherein said predetermined period is a period until said detecting means detects a position of the endless belt.

20. An apparatus according to claim 17, wherein said detecting means detects the position of the endless belt by rotation of the endless belt through a predetermined distance.

21. An apparatus according to claim 12, further comprising a pressing member for urging the supporting material and the belt to said heater.

22. An apparatus according to claim 12, wherein the endless belt has a thickness of not more than 100 microns.

23. An apparatus according to claim 12, wherein said fixing apparatus is used with an image forming apparatus having image forming means for forming a visualized image on the supporting material, and at least a part of which is openable, and wherein the power supply is terminated in association with opening of said image forming apparatus.

24. A lateral shift control apparatus for an endless belt, said apparatus comprising:
lateral shifting means for applying to the endless belt a lateral shifting force in both lateral directions;
switching means for switching the direction of the lateral shifting force by said lateral shifting means;
storing means for storing information relating to a lateral shift of the endless belt; and
determining means for determining the direction of the lateral shifting force of said lateral shifting means, when power supply to said apparatus is started, in accordance with information stored in said storing means.

* * * * *

UNITED STATES PATENT AND TRADEMARK OFFICE
CERTIFICATE OF CORRECTION

PATENT NO. : 5,153,655
DATED : October 6, 1992
INVENTOR(S) : YOSHIHIKO SUZUKI, ET AL.

It is certified that error appears in the above-identified patent and that said Letters Patent is hereby corrected as shown below:

COLUMN 2

Line 45, "FIG. 1" should read --FIG. 1.--.

COLUMN 4

Line 15, "to" (first occurrence) should read --so--.
    Line 34, "13 nd" should read --13 and--.

COLUMN 5

Line 4, "material" should read --material.--.
    Line 64, "sec" (first occurrence) should read --sec.,--.

COLUMN 7

Line 64, "motor" should read --motor.--.

UNITED STATES PATENT AND TRADEMARK OFFICE
CERTIFICATE OF CORRECTION

PATENT NO. : 5,153,655          Page 2 of 2
DATED      : October 6, 1992
INVENTOR(S): YOSHIHIKO SUZUKI, ET AL.

It is certified that error appears in the above-identified patent and that said Letters Patent is hereby corrected as shown below:

<u>COLUMN 9</u>

Line 29, "not" should read --not,--.

<u>COLUMN 10</u>

Line 11, "d/4 sec" should read --d/4 sec.--.

Signed and Sealed this

Twelfth Day of October, 1993

Attest:

BRUCE LEHMAN

Attesting Officer          Commissioner of Patents and Trademarks